United States Patent
Yamada

(10) Patent No.: US 7,831,389 B2
(45) Date of Patent: Nov. 9, 2010

(54) MAP EVALUATION SYSTEM AND MAP EVALUATION METHOD

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 899 days.

(21) Appl. No.: 11/708,160

(22) Filed: Feb. 19, 2007

(65) Prior Publication Data

US 2007/0198177 A1 Aug. 23, 2007

(30) Foreign Application Priority Data

Feb. 20, 2006 (JP) .............................. 2006-042181

(51) Int. Cl.
G01C 21/00 (2006.01)
G01C 21/30 (2006.01)
G01C 21/32 (2006.01)

(52) U.S. Cl. .................. 701/221; 701/200; 701/202; 701/205; 701/207; 701/210; 701/213; 701/216; 701/217; 701/220

(58) Field of Classification Search .................. None
See application file for complete search history.

(56) References Cited

U.S. PATENT DOCUMENTS

| | | | |
|---|---|---|---|
| 4,511,973 A * | 4/1985 | Miura et al. ................. | 701/208 |
| 5,469,360 A | 11/1995 | Ihara et al. | |
| 5,552,990 A | 9/1996 | Ihara et al. | |
| 6,154,152 A | 11/2000 | Ito | |
| 6,268,825 B1 | 7/2001 | Okada | |
| 6,674,434 B1 | 1/2004 | Chojnacki et al. | |
| 7,024,307 B2 | 4/2006 | Ito et al. | |
| 7,035,734 B2 * | 4/2006 | Shaffer et al. ................ | 701/210 |
| 7,330,788 B2 | 2/2008 | Mikuriya et al. | |
| 7,403,852 B2 | 7/2008 | Mikuriya et al. | |
| 2007/0198177 A1 * | 8/2007 | Yamada ...................... | 701/208 |

FOREIGN PATENT DOCUMENTS

| | | |
|---|---|---|
| DE | 10 2005 008 185 | 8/2006 |
| JP | 09-269726 | 10/1997 |
| JP | 2807140 (B2) | * 10/1998 |
| JP | 2002-054934 | 2/2002 |
| JP | 2004-198997 | 7/2004 |
| JP | 2005-147713 | 6/2005 |

OTHER PUBLICATIONS

Office Action dated Oct. 13, 2008 in German Application No. 10 2007 006 870.2 with English translation thereof.
Search/Examination Report dated Mar. 30, 2010 in corresponding German Patent Application No. 10 2007 006 870.2-54 with English translation.
Office Action dated Jul. 6, 2010 in Japanese Application No. 2006-042181 with English translation thereof.

* cited by examiner

*Primary Examiner*—Khoi Tran
*Assistant Examiner*—Bhavesh V Amin
(74) *Attorney, Agent, or Firm*—Harness, Dickey & Pierce, PLC

(57) ABSTRACT

An absolute position detector of a navigation device detects an absolute position of a vehicle. An on-map position of the vehicle is acquired based on the detected absolute position to be on a road map indicated by map data stored in the navigation device. Absolute positions detected by the absolute position detector are stored in association with on-map positions acquired based on the detected absolute positions as travel track information when the vehicle travels. An error of the map data as a reliability degree of the map data is set by comparing the travel track information with the map data.

12 Claims, 3 Drawing Sheets

US 7,831,389 B2

MAP EVALUATION SYSTEM AND MAP EVALUATION METHOD

CROSS REFERENCE TO RELATED APPLICATION

This application is based on and incorporates herein by reference Japanese Patent Application No. 2006-42181 filed on Feb. 20, 2006.

FIELD OF THE INVENTION

The present invention relates to a map evaluation system and a map evaluation method for evaluating a reliability degree of map data used in a navigation device or the like.

BACKGROUND OF THE INVENTION

A navigation device displays a current position of a subject vehicle on a road map indicated by map data based on an absolute position detected. This absolute position is detected by using both (i) absolute measurement data based on a satellite navigation method using a GPS sensor and (ii) relative measurement data based on a dead-reckoning navigation method using a gyro sensor, a speed sensor, or the like. Here, if a road map indicated by the map data has an error against the real road, an absolute position of the vehicle does not match with the road map indicated by the map data.

To that end, a navigation device performs a map-matching process for amending a vehicle position to match with a road map indicated by map data, and obtains a vehicle position based on the road map. The navigation device is thus required to display a vehicle position to match with a road map. In other words, even when a real road is significantly different from a road map (or a road on a road map) indicated by map data, a vehicle position is required to be displayed constantly to match with the road map.

In recent years, a navigation device has developed to cooperate with a vehicle control. For instance, a radiation direction of a headlight of a vehicle is controlled based on information on a curve obtained from map data. Controlling the vehicle to follow a road state based on the map data in the navigation device naturally requires an improvement in accuracy of the map data. To that end, a system is proposed which includes an information center for storing and maintaining road data (see Patent document 1).

Patent document 1: JP-3496479 B2 (U.S. Pat No. 6,154,152)

However, this system is intended to add new road data different from the road data already stored in the information center, and not to update the road data already stored in the information center. Therefore, accuracy in the already stored road data cannot be increased.

SUMMARY OF THE INVENTION

It is an object of the present invention to provide a map evaluation system and a map evaluation method for evaluating a reliability degree of map data used in a navigation device or the like.

According to an aspect of the present invention, a map evaluation system is provided as follows. A map data storage unit is configured to store map data indicating a road map. An absolute position detector is configured to detect an absolute position of a vehicle. An on-map position acquisition unit is configured to acquire an on-map position of the vehicle using the detected absolute position, the on-map position being based on a road map indicated by the stored map data. A track storing unit is configured to store, as travel track information, absolute positions detected by the absolute position detector in association with on-map positions acquired by using the detected absolute positions when the vehicle travels. A map reliability degree setting unit is configured to set as a reliability degree of the map data, an error of the map data relative to the travel track information by comparing the travel track information with the map data.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
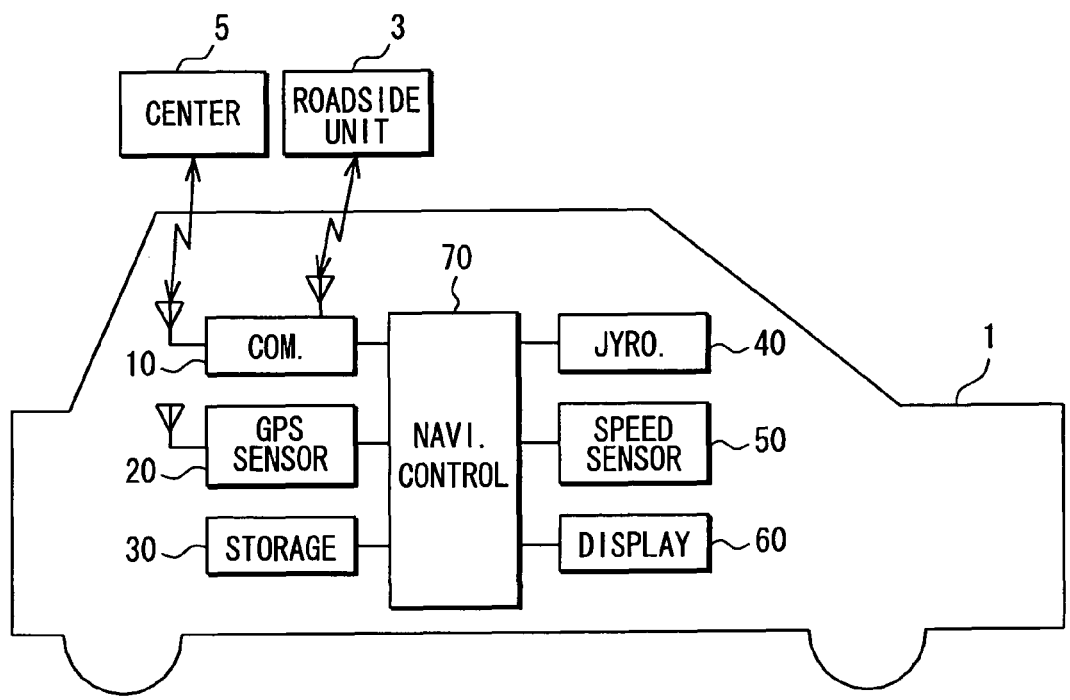
FIG. 1 is a diagram illustrating an overall structure of a navigation device according to an embodiment of the present invention.

A navigation device will be explained as an embodiment to which a map evaluation system of the present invention is adapted. An overall structure of the navigation device is illustrated in FIG. 1. The navigation device, which is mounted in a subject vehicle 1 as one of multiple vehicles 1, includes a communications unit 10, a GPS sensor 20, a storage unit 30, a gyro sensor 40, a speed sensor 50, a display unit 60, and a navigation control unit 70. Here, the GPS sensor 20, the gyro sensor 40, and the speed sensor 50 function as absolute position acquisition means.

The communications unit 10 receives information from one of roadside units 3, which are individually located along roads, via a short range wireless communications. The communications unit 10 further communicates with a center 5 as an external server, which collects information from the navigation device, via a communications network such as the Internet. The roadside unit 3 sends, to the navigation device, information including an absolute position (longitude, latitude, and altitude) corresponding to the location thereof. The center 5 manages and maintains map data used in navigation devices mounted in the multiple vehicles 1. The center 5 can receive and store information from the multiple vehicles 1 with the navigation devices.

The GPS (Global Positioning System) sensor 20 receives electric waves from satellites for GPS to detect an absolute position (longitude, latitude, and altitude) of the subject vehicle 1. Such detections of absolute positions of the vehicle 1 are periodically performed by the GPS sensor 20.

The storage unit 30 is a storage medium to store a variety of information, which can be read out or written thereon. For instance, the storage unit 30 is a hard disk drive (HDD). The storage unit 30 may be configured to alternatively read map data from a storage medium such as a semiconductor memory device, a flexible disk, a magnetic disk, or a magneto optical disk.

The storage unit 30 stores map data (electronic map) for indicating road maps. In the navigation device of this embodiment, when the vehicle 1 actually travels a road, the storage unit 30 stores travel track information for indicating a travel track thereof. This travel track information is a group of absolute positions (longitudes, latitudes, and altitudes), where the vehicle 1 has undergone or traveled with given intervals within a specified road segment in a road map indicated by map data. The travel track information is stored in association with the map data. The travel track information includes information on an error when each absolute position of the vehicle 1 was detected. The storage unit 30 stores a reliability degree of map data for indicating an accuracy of the map data relative to the travel track information.

The gyro sensor 40 (i.e., angular speed sensor) detects a direction to which the vehicle 1 advances to output detection signals based on angular speeds of rotational movements applied to the vehicle 1. The speed sensor 50 outputs pulse signals with intervals based on travel speeds of the vehicle 1. The display unit 60, e.g., a liquid crystal display, displays a variety of information such as road maps indicated by the map data.

The navigation control unit 70 mainly includes a microcomputer having a CPU, ROM, RAM, I/O, and bus line connecting the foregoing components and generally controls the above devices 10 to 60. The navigation control unit 70 performs several processes for (i) detecting an absolute position of the vehicle 1 based on detection signals from the GPS sensor 20, gyro sensor 40, and speed sensor 50, (ii) map-matching to amend a position of the vehicle 1 to match with a road map indicated by the map data stored in the storage unit 30, (iii) displaying both the road map and the position of the vehicle 1 amended by the map-matching process on the display unit 60, and (iv) then indicating an optimum travel route from a current position to an destination. Furthermore, the navigation device performs other processes for (i) setting a reliability degree of an absolute position of the vehicle 1, (ii) storing travel track information in the storage unit 30, (iii) setting a reliability degree of the travel track information, and (iv) setting a reliability degree of map data stored in the storage unit 30.

Figure 4:
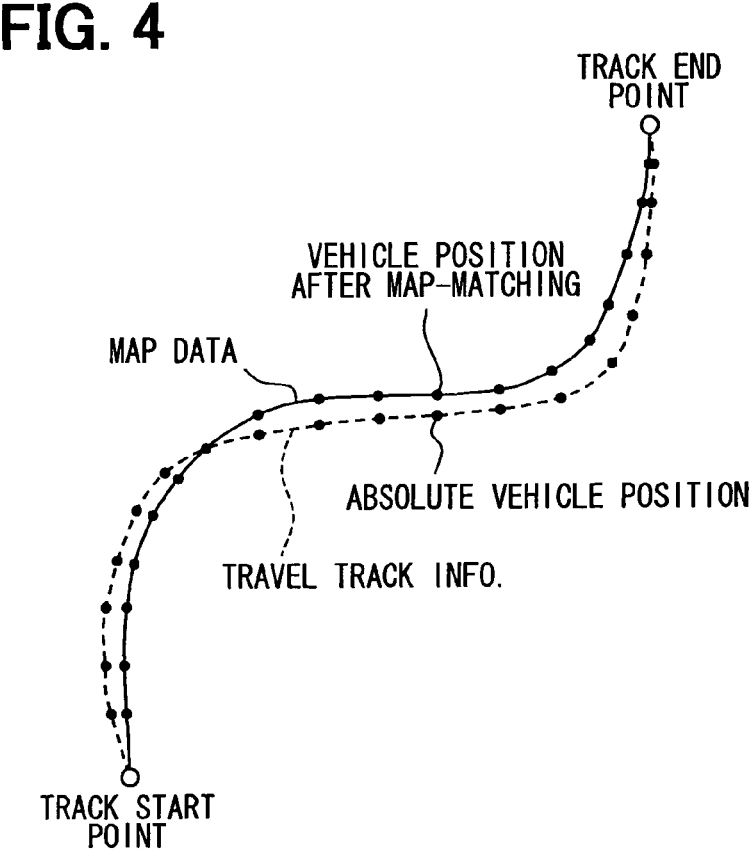
FIG. 4 illustrates a diagram illustrating an example of a relationship between travel track information and map data.
Figure 2:
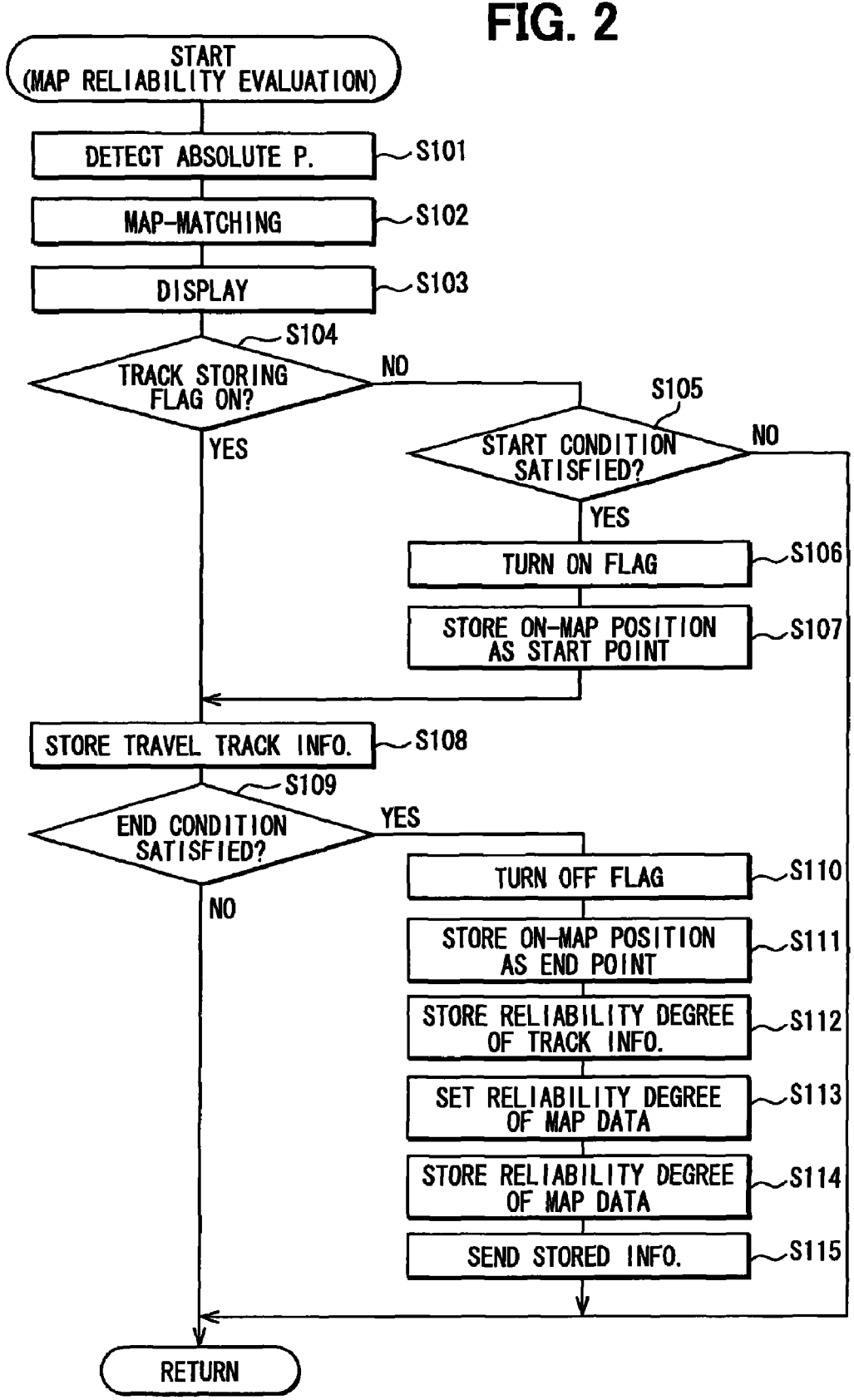
FIG. 2 is a flowchart diagram illustrating a map reliability evaluation process.
Figure 3:
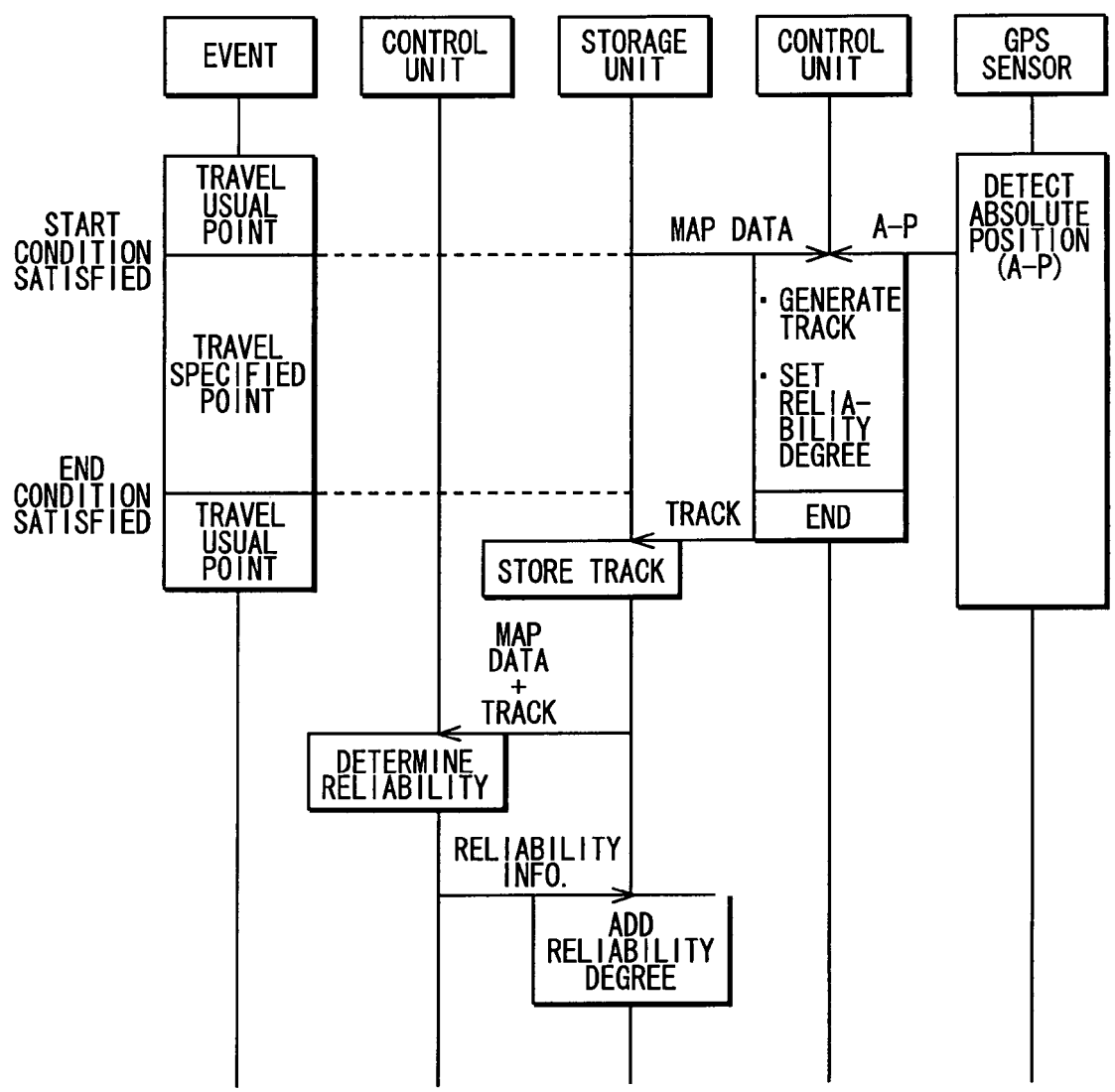
FIG. 3 is a time chart diagram illustrating operations in a navigation control unit, storage unit, and GPS sensor on a time basis.

Next, a map reliability evaluation process by the navigation device will be explained. FIG. 2 is a flowchart illustrating a map reliability evaluation process executed based on a program stored in the ROM or the like in the navigation control unit 70. FIG. 3 is a time chart illustrating operations in the navigation control unit 70, storage unit 30, and GPS sensor 20 on a time basis. In FIG. 3, a usual point means a travel region, where a travel track of the vehicle 1 should not be stored; a specified point means a travel region, where a travel track of the vehicle 1 should be stored. FIG. 4 illustrates an example of a relationship between travel track information and map data.

The map reliability evaluation process is executed periodically (every 200 ms) while the vehicle 1 travels. At first, an absolute position (longitude, latitude, and altitude) of the vehicle 1 at a current time point is detected (S101). This is prepared with absolute measurement data and relative measurement data at the same time. The absolute measurement data is acquired with a satellite navigation method based on detection signals from the GPS sensor 20; the relative measurement data is acquired with a dead-reckoning navigation method based on detection signals from the gyro sensor 40 and speed sensor 50. Further, when the GPS sensor 20 cannot detect an absolute position (i.e., when electric waves cannot be received from the satellites), the navigation control unit 70 tries to acquire an absolute position from a roadside unit 3. In other words, when a roadside unit 3 is located closely to the vehicle 1, the navigation control unit 70 causes the communications unit 10 to communicate with the roadside unit 3 for acquiring an absolute position, where the roadside unit 3 is situated.

Next, the current position (i.e., absolute position) detected at S101 is subjected to a map matching process for obtaining a position of the vehicle 1 on a basis of a road map indicated by the map data stored in the storage unit 30. In other words, the current position is amended to an on-map vehicle position, which is based on the road map to match with the road map (S102). Next, based on the on-map position after the map-matching process, the road map and the current position (i.e., on-map position) of the vehicle 1 are displayed on the display unit 60 (S103).

Next, it is determined whether a track storing flag is turned on or not (S104). This track storing flag indicates whether a travel track of the vehicle 1 should be stored or not. As explained later, when a start condition is satisfied which enables a travel track to be stored, the track storing flag is turned on (S106). When an end condition is satisfied which disables a travel track from being stored, the track storing flag is turned off (S110). Here, ON/OFF states of the track storing flag are stored in the RAM of the navigation control unit 70 and maintained until the engine of the vehicle 1 stops.

When the determination at S104 is negated (i.e., when the flag is determined to be turned off), it is determined whether a start condition which starts storing a travel track is satisfied (S105). Namely, it is determined whether a condition under which a travel track should be stored is satisfied. For instance, when (A) or (B) is satisfied and (C) or (D) is satisfied, the start condition is determined to be satisfied.

(A) An amendment amount in the map matching process at S102 is larger than a predetermined reference value (i.e., an error or difference between a real road and a road map (or a road on the road map) indicated by the stored map data is assumed to be large).

(B) A vehicle position is located within a predetermined specified region. This specified region is specified as a region surrounding a point where accidents or potential dangers often arise.

(C) The GPS sensor 20 can detect an absolute position. Alternatively, the vehicle 1 has traveled for less than a predetermined travel distance from a point where the GPS sensor 20 was able to detect an absolute position. The predetermined travel distance is defined as a distance within which the dead-reckoning navigation method can maintain a predetermined accuracy.

(D) An absolute position can be obtained from a roadside unit 3. Alternatively, the vehicle 1 has traveled for less than a predetermined travel distance from a point where an absolute position was able to be obtained from a roadside unit 3. The predetermined travel distance is similarly defined as a distance within which the dead-reckoning navigation method can maintain a predetermined accuracy.

When the start condition is determined to be satisfied at S105, the track storing flag is turned on (S106). This switches from a usual point to a specified point in FIG. 3.

Next, the map data is obtained from the storage unit 30 and a current on-map position of the vehicle 1, which is based on the obtained map data, is stored in the storage unit 30 as a track start point for indicating a start of a travel track (S107). S108 is then performed.

In contrast, when the determination at Step S104 is affirmed (i.e., when the flag is determined to be turned on), S108 is then also performed.

Next, the absolute position detected at S101 and an estimated error of the GPS sensor 20 are stored in the storage unit 30 as travel track information (S108). In this case, the travel track information is stored in association with the track start point stored in the storage unit 30; which is latest (i.e., most recently stored). The estimated error of the GPS sensor 20 means a value for indicating an accuracy of an absolute position of the vehicle 1 detected by the GPS. For instance, the value is determined using the number of satellites from which the GPS sensor receives electric waves. As the number is larger, the estimate error or the value is smaller. In detail, the estimated error level varies "large," "medium," "small," and "minimum" against "three," "four," "five," and "six or more," respectively. The reason, why the estimated error level is decreased as the number of satellites from which electric waves are received increases, is that more accurate combination can be achieved as the number of satellites increases.

At S108, when track information is already stored with respect to the same travel road, update of the absolute position is executed based on the estimated error level of the GPS sensor 20. When the already registered estimated error level is larger, the absolute position is updated; when the already registered estimated error level is smaller, the absolute position is not updated. When the already registered estimated error level is the same, the absolute position may be either updated or not updated. Alternatively, the already registered absolute position may be updated by the average of the current absolute position and the already registered absolute position, which enhances the accuracy of the absolute position.

Next, it is determined whether an end condition which ends storing the travel track of the vehicle 1 is satisfied (S109). Namely, it is determined whether a condition, under which a travel track should be stored, becomes not-satisfied. For instance, when (E) and (F) are simultaneously satisfied or when (G) and (H) are simultaneously satisfied, the end condition is determined to be satisfied.

(E) An amendment amount in the map matching process at Step s102 is smaller than a predetermined reference value (i.e., an error or difference between a real road and a road map (or a road on the road map) indicated by the stored map data is assumed to be small).

(F) A vehicle position is outside of the predetermined specified region, which is the same as that in above (B).

(G) The GPS sensor 20 cannot detect an absolute position. At the same time, the vehicle 1 has traveled for not less than the predetermined travel distance, which is the same as that in above (C), from a point where the GPS sensor 20 was able to detect an absolute position.

(H) An absolute position cannot be obtained from any roadside unit 3. At the same time, the vehicle 1 has traveled for not less than the predetermined travel distance, which is the same as that in (D), from a point where an absolute position was able to be obtained from a roadside unit 3.

When the end condition is determined to be satisfied at S109, the track storing flag is turned off (S110). This switches from the specified point to the usual point in FIG. 3.

Next, the map data is obtained from the storage unit 30 and a current on-map position of the vehicle 1, which is based on the obtained map data, is stored in the storage unit 30 as a track end point for indicating an end of the travel track (S111). Thus, the travel track information is stored with respect to a travel segment from the track start point stored at S107 to the track end point stored at S111.

Next, a reliability degree of the travel track information is stored in the storage unit 30 (S112). In detail, in this case, the reliability degree is stored in the storage unit 30 in association with the travel segment from the track start point to the track end point stored. The reliability degree of the travel track information is determined based on the travel track information associated with the track start point or the travel segment from the track start point to the track end point.

In detail, when the travel track information includes at least one "large" level of estimated error, the reliability degree level is regarded as "low." When the travel track information includes at least one "medium" level of estimated error, the reliability degree level is regarded as "medium." When the travel track information includes at least one "small" level of estimated error, the reliability degree level is regarded as "high." When the travel track information includes none of "large," "medium," and "small" levels of estimated errors, or when the travel track information includes only "minimum" level of estimated error, the reliability degree level is regarded as "maximum."

Here, "maximum" level of the reliability degree corresponds to an accuracy having an error of less than ±1 m; "high" level corresponds to an accuracy having an error less than ±5 m and equal to or more than ±1 m; "medium" level corresponds to an accuracy having an error less than ±10 m and equal to or more than ±5 m; and "low" level corresponds to an accuracy having an error equal to or more than ±10 m.

Next, a reliability degree of the map data is set (S113). The reliability degree of the map data indicates an error of the map data against a real road. The reliability degree of the map data is determined by comparing the road on the road map indicated by the corresponding map data with the travel track information as a comparison reference. Here, comparison is executed at multiple comparison points, which are equal to the multiple vehicle's absolute positions included in the travel track information. Then, the error of the map data is obtained as an average of the errors at the comparison points. Alternatively, the error of the map data may be obtained from a correlation between the travel track information and the road map indicated by the corresponding map data.

When the reliability degree of the map data is set, the reliability degree of the travel track information as the comparison reference needs to have a high reliability degree. To that end, setting the reliability degree at S113 is only executed with respect to the travel track information having a reliability degree exceeding a predetermined reference value (i.e., executed with respect to the (travel track information set as having the "maximum" level of the reliability degree at S112). Further, the same road may be traveled again. In this case, when the travel track information for the same traveled road is updated (i.e., when the reliability degree of the travel track information is increased), setting the reliability degree of the map data at S113 is executed again.

In this embodiment, the reliability degree of the map data is digitalized. As the error of the map data is smaller, the reliability degree of the map data becomes higher; as the error of the map data is larger, the reliability degree of the map data becomes lower. In detail, when the error of the map data against the travel track information is less than ±1 m, the reliability degree is set to 100. When the error is less than ±5 m and equal to or more than ±1 m, the reliability degree is set to 80. When the error is less than ±10 m and equal to or more than ±5 m, the reliability degree is set to 60. When the error is equal to more than ±10 m, the reliability degree is set to 40.

Next, the reliability of the map data set at S113 is stored in the storage unit 30 (S114). The data stored in the storage unit 30 are then transmitted to the center 5 (S115). The stored data transmitted to the center 5 include (i) the reliability degree of the map data, (ii) the track start point to the track end point, both of which indicate the travel segment of the map data with the reliability degree set, and (iii) the travel track information corresponding to the travel segment.

As explained above, in the navigation device in this embodiment, absolute positions are detected in keeping with traveling of the subject vehicle 1. The detected absolute positions are stored as a travel track. The travel track is compared with the corresponding map data to thereby compute an error of the map data, which allows setting of a reliability degree of the map data. The reliability degree of the map data is then sent to the center 5. The center 5 accumulates the reliability degrees of the map data received from multiple vehicles 1. For instance, when the center 5 finds a certain road having the reliability degree less than a predetermined value based on the reliability degree of the map data, the center 5 newly generates map data for the certain road.

Further, this embodiment prevents the useless storing process of travel track information. When travel track information cannot obtain higher accuracy than that of the road map, its storing process becomes useless. In other words, the storing process is executed when (A) and (B) are satisfied at the same time. (A) The vehicle 1 travels a real road, from which a road map indicated by the corresponding map data is significantly different (i.e., the accuracy of the road map is very low) or in which the vehicle control is highly required (e.g., the vehicle 1 travels a region surrounding a point where accidents or potential dangers often arise). (B) The absolute position of the vehicle 1 can be highly accurately obtained.

Further, the vehicle control can be performed in the navigation device using the map data securing a predetermined reliability degree. Thus performed vehicle control includes controls for a radiation direction of a headlight of the vehicle 1, a driving force, a braking force, an air-conditioner, or the like. For a vehicle control requiring a high accuracy, only map data having a reliability degree of 100 may be used. For a vehicle control requiring not so high accuracy, map data having a reliability degree equal to or more than 80 may be used.

(Others)

In the above embodiment, information on the reliability degree of the map data is sent from the navigation device mounted in the subject vehicle 1 to the center 5 via wireless communications; however, the information may be also transported at a spot such as a car dealer via wired communications or portable storage medium. This allows a large data volume to be transmitted to the center 5 for a short time period.

Furthermore, in the above embodiment, the navigation device sets a reliability degree of map data at S113 in FIG. 2; alternatively, the center 5 may set a reliability degree of map data based on map data and travel track information sent from the navigation devices.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A map evaluation system comprising:
   a map data storage unit configured to store map data indicating a road map;
   an absolute position detector configured to detect an absolute position of a vehicle by receiving electric waves from satellites;
   an on-map position acquisition unit configured to acquire an on-map position of the vehicle using the detected absolute position, the on-map position being based on a road map indicated by the stored map data;
   a track storing unit configured to store, as travel track information, absolute positions detected by the absolute position detector in association with on-map positions acquired by using the detected absolute positions when the vehicle travels;
   a map reliability degree setting unit configured to set as a reliability degree of the map data, an error of the map data relative to the travel track information by comparing the travel track information with the map data; and
   a track reliability degree setting unit configured to set a reliability degree of the travel track information based on a detection accuracy of the detected absolute position, the detection accuracy being variable based on a state where the absolute position is detected; wherein
   the track storing unit stores the set reliability degree of the travel track information in association with the travel track information, and
   the map reliability degree setting unit sets the reliability degree of the map data only using travel track information which has a reliability degree exceeding a predetermined reference value.

2. The map evaluation system of claim 1, further comprising:
   a track storing determination unit configured to determine whether a travel track of the vehicle is allowed to be stored based on the on-map position,
   wherein the track storing unit stores the travel track information when it is determined that the travel track is allowed to be stored.

3. The map evaluation system of claim 2,
   wherein the on-map position acquisition unit acquires the on-map position by performing an amendment to the detected absolute position to match with the road map indicated by the stored map data, and
   wherein the track storing determination unit determines that the travel track is allowed to be stored when the amendment. to the detected absolute position is larger than a predetermined determination reference.

4. The map evaluation system of claim 2,
   wherein the track storing determination unit determines that the travel track is allowed to be stored when the on-map position is within a region predetermined in the road map.

5. The map evaluation system of claim 1, further comprising:
   a communications unit configured to communicate with an external server, which manages the map data, and to transmit the reliability degree of the map data to the external server.

6. A map evaluation method for setting a reliability degree of map data in a map data storage unit, the method comprising:
   detecting an absolute position of a vehicle by using an absolute position detector by receiving electric waves from satellites;

acquiring an on-map position of the vehicle by using the detected absolute position, the on-map position being based on a road map indicated by the stored map data;

storing, as travel track information, absolute positions detected by the absolute position detector in association with on-map positions acquired by using the detected absolute positions when the vehicle travels;

setting as a reliability degree of the map data, an error of the map data relative to the travel track information by comparing the travel track information with the map data; and setting a reliability degree of the travel track information based on a detection accuracy of the detected absolute position, the detection accuracy being variable based on a state where the absolute position is detected; wherein the set reliability degree of the travel track information is stored in association with the travel track information, and the reliability degree of the map data is set only using travel track information which has a reliability degree exceeding a predetermined reference value.

7. The map evaluation method of claim 6, further comprising:

determining whether a travel track of the vehicle is allowed to be stored based on the on-map position, wherein the travel track information is stored when it is determined that the travel track is allowed to be stored.

8. The map evaluation method of claim 7, wherein the on-map position is acquired by performing an amendment to the detected absolute position to match with the road map indicated by the stored map data, and wherein it is determined that the travel track is allowed to be stored when the amendment to the detected absolute position is larger than a predetermined determination reference.

9. The map evaluation method of claim 7, wherein it is determined that the travel track is allowed to be stored when the on-map position is within a region predetermined in the road map.

10. The map evaluation method of claim 6, further comprising:

transmitting the reliability degree of the map data by using a communications unit to an external server, which manages the map data.

11. The map evaluation system of claim 1, wherein an estimated error of the absolute position of the vehicle decreases as the number of satellites increases.

12. The map evaluation method of claim 6, further comprising storing an estimated error of the absolute position of the vehicle wherein the estimated error decreases as the number of satellites increases.

* * * * *